United States Patent
Xu et al.

(10) Patent No.: US 10,704,986 B2
(45) Date of Patent: Jul. 7, 2020

(54) METHOD AND APPARATUS FOR NONDESTRUCTIVE DETERMINATION OF CORE SIZE OF HOLLOW-CORE PHOTONIC BANDGAP FIBER USING FABRY-PEROT INTERFERENCE

(71) Applicant: BEIHANG UNIVERSITY, Beijing (CN)

(72) Inventors: Xiaobin Xu, Beijing (CN); Ningfang Song, Beijing (CN); Xiaoyang Wang, Beijing (CN); Fuyu Gao, Beijing (CN); Zhihao Zhang, Beijing (CN); Wei Cai, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 16/251,573

(22) Filed: Jan. 18, 2019

(65) Prior Publication Data

US 2019/0316988 A1 Oct. 17, 2019

(30) Foreign Application Priority Data

Apr. 12, 2018 (CN) .......................... 2018 1 0327055
May 7, 2018 (CN) .......................... 2018 1 0424200

(51) Int. Cl.
*G01B 9/02* (2006.01)
*G01M 11/00* (2006.01)
*G01B 11/02* (2006.01)
*G01M 11/08* (2006.01)
*G02B 6/02* (2006.01)

(52) U.S. Cl.
CPC ......... *G01M 11/37* (2013.01); *G01B 9/02055* (2013.01); *G01B 11/02* (2013.01); *G01M 11/088* (2013.01); *G02B 6/02328* (2013.01)

(58) Field of Classification Search
CPC . G01M 11/37; G01M 11/088; G01B 9/02055; G01B 11/02; G01B 11/14; G01J 9/0246; G02B 6/02328
USPC .................................................. 356/454, 506
See application file for complete search history.

(56) References Cited

U.S. PATENT DOCUMENTS

2002/0171823 A1* 11/2002 Shurgalin ............ C03B 37/0253
356/73.1
2008/0192239 A1* 8/2008 Otosaka ................. G01B 11/08
356/73.1

\* cited by examiner

*Primary Examiner* — Michael A Lyons
*Assistant Examiner* — Jonathon Cook
(74) *Attorney, Agent, or Firm* — Pai Patent & Trademark Law Firm; Chao-Chang David Pai

(57) ABSTRACT

The nondestructive determination of core size of a hollow-core photonic bandgap fiber (HC-PBF) using Fabry-Perot (FP) interference is performed with an apparatus including a tunable laser source (TLS), a 1×2 single-mode (SM) coupler, an SM collimator, a six-axis translation stage, an optical detector, and an oscilloscope. The light from the TLS passes through the 1×2 SM coupler and the SM collimator to perpendicularly enter two parallel air-$SiO_2$ interfaces of the core of the fiber and is reflected, while the TLS is tuned from one wavelength to another. Then the reflected spectrum is guided to the optical detector, where its interference intensity is converted into voltage intensity to be displayed at the oscillator and fitted with a least-squares method to obtain the distance between the two air-$SiO_2$ interfaces. The core size of the fiber can be obtained by rotating the fiber and repeating the procedure at multiple angular positions.

12 Claims, 4 Drawing Sheets

```
┌─────────────────────────────────────────────────────────────────────┐
│ Remove the coating of the FUT, fill all the air holes within the HC-PBF, except the │
│ core, with index-matching oil, and immerse the FUT into index-matching oil           │
└─────────────────────────────────────────────────────────────────────┘
                                     ↓
┌─────────────────────────────────────────────────────────────────────┐
│ Immerse the SM collimator into index-matching oil by adjusting the six-axis         │
│                              translation stage                                       │
└─────────────────────────────────────────────────────────────────────┘
                                     ↓
┌─────────────────────────────────────────────────────────────────────┐
│ Adjust the position and angle of the SM collimator and rotate the FUT to launch     │
│ collimated light into two air-$SiO_2$ interfaces in fiber core at an angle of         │
│ approximately 90-deg, the two air-$SiO_2$ interfaces perform as a FP cavity           │
└─────────────────────────────────────────────────────────────────────┘
                                     ↓
┌─────────────────────────────────────────────────────────────────────┐
│ Tune the TLS from one wavelength to another, its emergent light strikes the FUT, and│
│ is reflected by the FP cavity. The reflected spectrum of the FP cavity passes through│
│         SM collimator and the 1×2 SM coupler and reach the detector                  │
└─────────────────────────────────────────────────────────────────────┘
                                     ↓
┌─────────────────────────────────────────────────────────────────────┐
│ The interference intensity at each different wavelength is converted into a voltage │
│ signal by the detector, then the voltage signal is passed to the oscilloscope, and output│
│                              voltage intensity                                       │
└─────────────────────────────────────────────────────────────────────┘
                                     ↓
┌─────────────────────────────────────────────────────────────────────┐
│ The core size of HC-BPF is determined by fitting the reflected spectrum using a least-│
│                              squares method                                          │
└─────────────────────────────────────────────────────────────────────┘
                                     ↓
┌─────────────────────────────────────────────────────────────────────┐
│ Find out six positions where the reflected power is a local maximum during fiber    │
│ rotation from 0° to approximately 180°, and resolve the six distances at the six    │
│              positions, therefore, the core size of the FUT is obtained              │
└─────────────────────────────────────────────────────────────────────┘
                                     ↓
┌─────────────────────────────────────────────────────────────────────┐
│ equidistantly move the SM collimator along the axis of the FUT with the six-axis    │
│ translation stage, repeat measurements, and resolve core size at different positions,│
│                     then evaluate uniformity of the core size                        │
└─────────────────────────────────────────────────────────────────────┘
```

FIG. 2

METHOD AND APPARATUS FOR NONDESTRUCTIVE DETERMINATION OF CORE SIZE OF HOLLOW-CORE PHOTONIC BANDGAP FIBER USING FABRY-PEROT INTERFERENCE

BACKGROUND OF THE INVENTION

1. Field of the Invention

The invention relates generally to optical fiber and in particular to the measuring and testing techniques of fiber parameters. More specifically, the invention relates to an optical technique for nondestructive determination of core size of hollow-core photonic bandgap fiber using Fabry-Perot interference.

2. Background Art

The hollow-core photonic bandgap fiber (HC-PBF) is a new kind of microstructure fiber based on the photonic bandgap effect. The photonic bandgap effect is generated by two-dimensional photonic crystals of periodic arrangement of $SiO_2$ and air holes, which can confine light propagation in the core of the HC-PBF. Compared to traditional optical fibers, HC-PBFs exhibit many advantages, including excellent environmental adaptability (to temperature, electromagnetic field, space radiation, etc.), extremely low nonlinearity, ultralow latency and so on. Therefore, HC-PBFs have a great potential in the application of fiber communication and fiber optic sensors, especially fiber-optical gyroscope.

However, there exists an axial non-uniformity problem in the process of drawing HC-PBFs, which affects optical performance. This non-uniformity is mainly due to the fact that the popular "stack-and-draw" fabricating technique is very complicated, and a number of parameters have to be controlled during the drawing process. Inevitably the HC-PBF core, which contributes most to the optical performance, cannot be always an ideal circle or polygon owing to the fluctuation of such drawing parameters as temperature, gas pressure, drawing velocity, tension and so on. High-sensitivity experimental determination of the core size and its uniformity is thus important and significant for the assessment of the HC-PBF performance, which can guide the drawing progress of HC-PBFs.

Up to now, the preferred high-precision methods of measuring the core size and its uniformity of HC-PBFs have been the cut-off method and the X-ray computed tomography (CT) method. The cut-off method is the most direct approach, and is to cleave the HC-PBF to a flat cross-section and investigate the cross-section using an optical microscope or scanning electron microscope (SEM), but it is insufficiently precise to get the core geometry and size because it is very difficult to obtain a perfectly flat cross-section and to place it at an ideal angle between the fiber cross-section and the lens of the microscope. As a result, an ellipse often appears, which seriously affects the measurement. What is more, it is difficult to measure the axial uniformity of the core size even with a space resolution of millimeter for this destructive technique. The CT method is a nondestructive structural investigation of the HC-PBF using X-ray computed tomography (CT), and could obtain the internal features with a sub-micron resolution. But this method is expensive and time-consuming.

Therefore, there is a need for a nondestructive and simple method to measure the core size and its uniformity of the HC-PCF with high sensitivity and resolution.

BRIEF SUMMARY OF THE INVENTION

Accordingly, to solve the above problems, the invention provides an apparatus and method for nondestructive determination of the core size of a hollow-core photonic bandgap fiber (HC-PBF) using Fabry-Perot (FP) interference.

The apparatus of the invention mainly includes a tunable laser source (TLS), a 1×2 single-mode (SM) coupler, a SM collimator, a six-axis translation stage, a tank containing an index-matching oil, an optical detector, and an oscilloscope.

The TLS and the optical detector are connected to the 1×2 SM coupler, the SM collimator is connected to the 1×2 SM coupler. The SM collimator is fixed by a support fixture, which is connected to the six-axis translation stage, so the position of the SM collimator can be adjusted by the six-axis translation stage. The optical detector is further connected to the oscilloscope.

To determine the core size of an HC-PBF, the SM collimator and the HC-PBF under test (FUT) are immersed within an index-matching oil in the tank, then an FP cavity is formed between two air-$SiO_2$ interfaces of the core by adjusting the six-axis translation stage and rotating the fiber. Then while the TLS is tuned from one wavelength to another within a preset range, its emergent light passes through the 1×2 SM coupler and the SM collimator in sequence, and becomes spatially collimated. The spatially collimated light strikes the FUT and is reflected by the core of the FUT. The reflected spectrum of the FP cavity passes through the SM collimator and the 1×2 SM coupler and reach the optical detector. Then the size of the FUT can be calculated by analyzing the reflected spectrum.

More specifically, the method in accordance with the invention for nondestructive determination of the core size of an HC-PBF using Fabry-Perot interference includes the following steps:

Step 1: remove the coating of the FUT, fill all the air holes within the HC-PBF, except the core, with index-matching oil whose relative refractive index difference is less than 1% compared with $SiO_2$, and immerse the FUT into the index-matching oil.

Step 2: immerse the SM collimator into the index-matching oil by adjusting the six-axis translation stage.

Step 3: adjust the position and angle of the SM collimator and rotate the FUT in order that the collimated light strikes two air-$SiO_2$ interfaces of the core of the FUT at an angle of approximately 90°, and so the two air-$SiO_2$ interfaces perform as an FP cavity.

Step 4: tune the TLS from one wavelength to another, its emergent light strikes the FUT, and is reflected by the FP cavity. The reflected spectrum of the FP cavity passes through the SM collimator and the 1×2 SM coupler and reaches the optical detector.

The reflected spectrum from the FP cavity reflects the variation of the interference intensity $I_{interference}$ versus wavelength $\lambda$, and $$I_{interference} = I_1 + I_2 + 2\sqrt{I_1 I_2} \cos\left(\frac{4\pi n d}{\lambda} + \pi\right)$$

where $I_1$ is the light intensity of $W_1$; $I_2$ is the light intensity of $W_2$; $W_1$ and $W_2$ represent parallel reflected lights from the two air-SiO$_2$ interfaces; n is the refractive index of air in the core of the FUT; λ is the wavelength of W$_1$ and W$_2$; and d is the distance between the two air-SiO$_2$ interfaces of the core.

Step 5: the interference intensity I$_{interference}$ at each wavelength is converted into a voltage signal by the optical detector, then the voltage signal is passed to the oscilloscope, and the oscilloscope outputs a voltage intensity V$_{interference}$:

$$V_{interference} = V_1 + V_2 + 2\sqrt{V_1 V_2} \cos\left(\frac{4\pi n d}{\lambda} + \pi\right)$$

where V$_1$, V$_2$ and V$_{interference}$ are the voltage intensity corresponding to I$_1$, I$_2$ and I$_{interference}$, respectively.

Step 6: the core size of the FUT is determined by fitting the curve of voltage intensity V$_{interference}$ versus wavelength λ to the equation in Step 5 using a least-squares method. The value of parameter d is obtained when the fitting result is optimal and corresponds to the width of the core of the FUT in the direction of the collimated light.

Step 7: find out six positions where the reflected voltage intensity is a local maximum in the course of rotating the fiber from 0° to approximately 180°, and resolve the six values of d at the six positions, and the core size of the FUT may be obtained from the six values.

Step 8: equidistantly move the SM collimator along the axis of the FUT with the six-axis translation stage, repeat steps 1-7, and resolve the core size at different axial positions, then the uniformity of the core size may be evaluated.

The advantages and benefits of the apparatus and method according to the invention lie in:

(1) the method is a nondestructive, so the core size of an HC-PBF may be measured without destroying it;

(2) the apparatus is simple and low cost;

(3) the method can be accomplished with high sensitivity and resolution.

BRIEF DESCRIPTION OF THE DRAWINGS

FIG. 2 is the flow diagram of the method for nondestructive determination of the core size of a hollow-core photonic bandgap fiber using Fabry-Perot interference;

DESCRIPTION OF THE PREFERRED EMBODIMENT

The present invention will be further described in detail below in conjunction with the accompanying figures and examples.

The invention provides an apparatus and method for nondestructive determination of the cores size of a hollow-core photonic bandgap fiber (HC-PBF) using Fabry-Perot (FP) interference, which can also be used to evaluate the uniformity of the core size along the axial direction of the HC-PBF.

Figure 1:
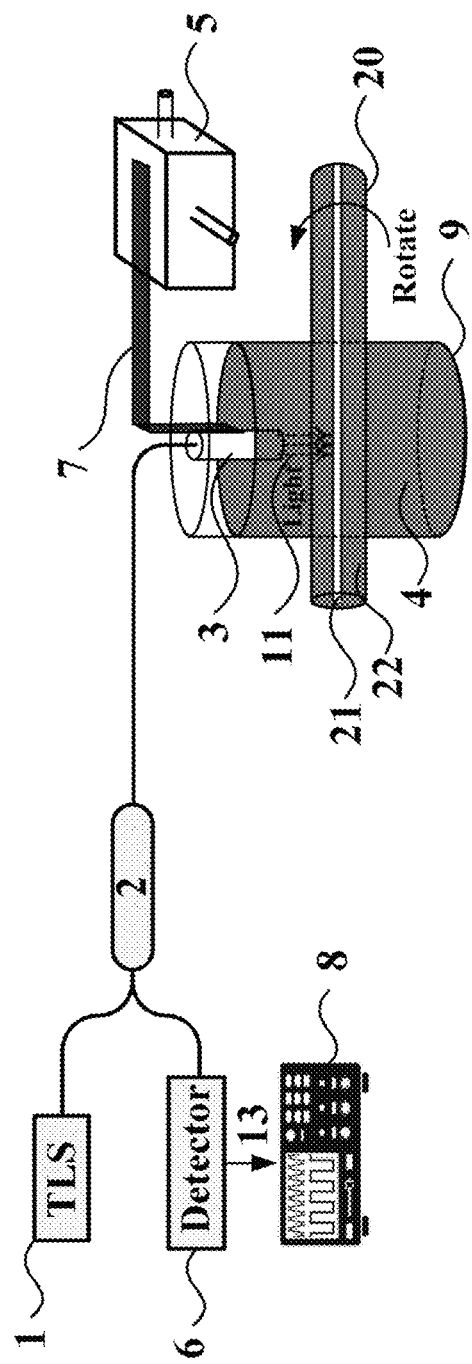
FIG. 1 is a schematic of the apparatus for nondestructive determination of the core size of a hollow-core photonic bandgap fiber using Fabry-Perot interference.

As FIG. 1 shows, the apparatus of the invention mainly includes a tunable laser source (TLS) 1, a 1×2 single-mode (SM) coupler 2, an SM collimator 3, a six-axis translation stage 5, a tank 9 containing an index-matching oil 4, an optical detector 6, and an oscilloscope 8.

The TLS 1 and the optical detector 6 are connected to the 1×2 SM coupler 2, the 1×2 SM coupler 2 is connected to the SM collimator 3. The SM collimator 3 is fixed by a support fixture 7, which is connected to the six-axis translation stage 5, so the position of the SM collimator 3 can be adjusted by the six-axis translation stage 5. The optical detector 6 is also connected to the oscilloscope 8.

To determine the core size of an HC-PBF, the SM collimator 3 and the HC-PBF under test (FUT) 20 are immersed within the index-matching oil 4, then an FP cavity 25 is formed between two air-SiO$_2$ interfaces (e.g. A$_+$ and A$_-$ in FIG. 3) of the core 21 of the FUT 20 by adjusting the six-axis translation stage 5 and rotating the FUT 20.

Then while the TLS 1 is tuned from one wavelength to another, its emergent light is spatially collimated after passing through the 1×2 SM coupler 2 and the SM collimator 3 in sequence. The direction of the collimated light 11 from the SM collimator 3 is indicated by the arrows in FIG. 1. The collimated light 11 strikes the FUT 20 and is reflected by the core 21 of the FUT 20. The reflected spectrum of the FP cavity 25 passes through the SM collimator 3 and the 1×2 SM coupler 2 and reach the optical detector 6. Then the core size of the FUT 20 can be calculated by analyzing the reflected spectrum, as will be explained in detail in the following.

Using the measurement apparatus described above, according to the method of the invention, as the flow diagram in FIG. 2 shows, the nondestructive determination of the core size of an HC-PBF using Fabry-Perot interference specifically includes the following steps:

Step 1: remove the coating 22 of the FUT 20, fill all the air holes 23 within the FUT 20, except the core 21, with an index-matching oil 4, and immerse the FUT 20 into the index-matching oil 4 in the tank 9.

Figure 3:
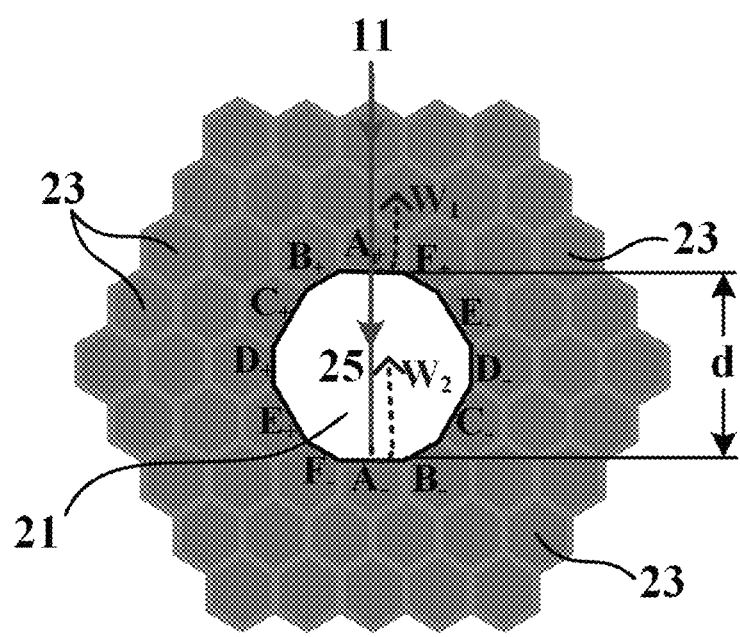
FIG. 3 shows a cross section of the HC-PBF with all the air holes, except the core, filled with an index-matching oil.

As FIG. 3 shows, the core 21 of the FUT 20 is dodecagon. The index-matching oil 4 is an oil having its refractive index within 1% of the refractive index of SiO$_2$.

Step 2: immerse the SM collimator 3 into the index-matching oil 4 by adjusting the six-axis translation stage 5.

Step 3: adjust the position and angle of the SM collimator 3 and rotate the FUT 20 in order that the collimated light 11 strikes two air-SiO$_2$ interfaces (A$_+$/A$_-$) of the core 21 of the FUT 20 at an angle of approximately 90° (namely, the angle of incidence=0°), and so the two air-SiO$_2$ interfaces (A$_+$/A$_-$) perform as an FP cavity.

Step 4: tune the TLS 1 from one wavelength to another within a preset range, its emergent light strikes the FUT 20, and is reflected by the FP cavity 25. The reflected spectrum of the FP cavity 25 passes through the SM collimator 3 and the 1×2 SM coupler 2 and reach the optical detector 6.

The reflected spectrum from the FP cavity 25 reflects the variation of the interference intensity I$_{interference}$ versus wavelength λ.

As FIG. 3 shows, reflections of the collimated light 11 only occur at two parallel air-SiO$_2$ interfaces (A$_+$/A$_-$) of the core 21. Let the two parallel reflected lights of the two air-SiO$_2$ interfaces (A$_+$/A$_-$) be denoted as W$_1$ and W$_2$. It is noted that the other light waves caused by multiple reflections of the FP cavity 25 can be neglected owing to their low reflectivity. Interference occur between $W_1$ and $W_2$, and the interference intensity $I_{interference}$ is shown as:

$$I_{inference} = I_1 + I_2 + 2\sqrt{I_1 I_2} \cos \Delta\Phi \quad (1)$$

where $I_1$ is the light intensity of $W_1$; $I_2$ is the light intensity of $W_2$; $\Delta\Phi$ is the phase difference of $W_1$ and $W_2$, and can be expressed as:

$$\Delta\Phi = \frac{4\pi n d}{\lambda} + \pi \quad (2)$$

where n is the refractive index of air in the core 21 of the FUT 20, and is approximately equal to 1, $\lambda$ is the wavelength of $W_1$ and $W_2$, and d is the distance between the two air-$SiO_2$ interfaces ($A_+/A_-$) of the core 21.

By combining equations (1) and (2), one can obtain the ultimate form of interference intensity $I_{Inference}$ as:

$$I_{interference} = I_1 + I_2 + 2\sqrt{I_1 I_2} \cos\left(\frac{4\pi n d}{\lambda} + \pi\right) \quad (3)$$

Step 5: the interference intensity $I_{interference}$ at each different wavelength is converted into a voltage signal 13 by the optical detector 6, then the voltage signal 13 is passed to the oscilloscope 8, and the oscilloscope 8 displays and outputs the voltage intensity $V_{inference}$.

The output voltage intensity $V_{inference}$ may be shown as:

$$V_{interference} = V_1 + V_2 + 2\sqrt{V_1 V_2} \cos\left(\frac{4\pi n d}{\lambda} + \pi\right) \quad (4)$$

where $V_1$, $V_2$ and $V_{inference}$ are the voltage intensity corresponding to $I_1$, $I_2$ and $I_{interference}$, respectively.

Step 6: the core size of the FUT 20 is determined by fitting the reflected spectrum to equation (4) using a least-squares method.

Figure 4:
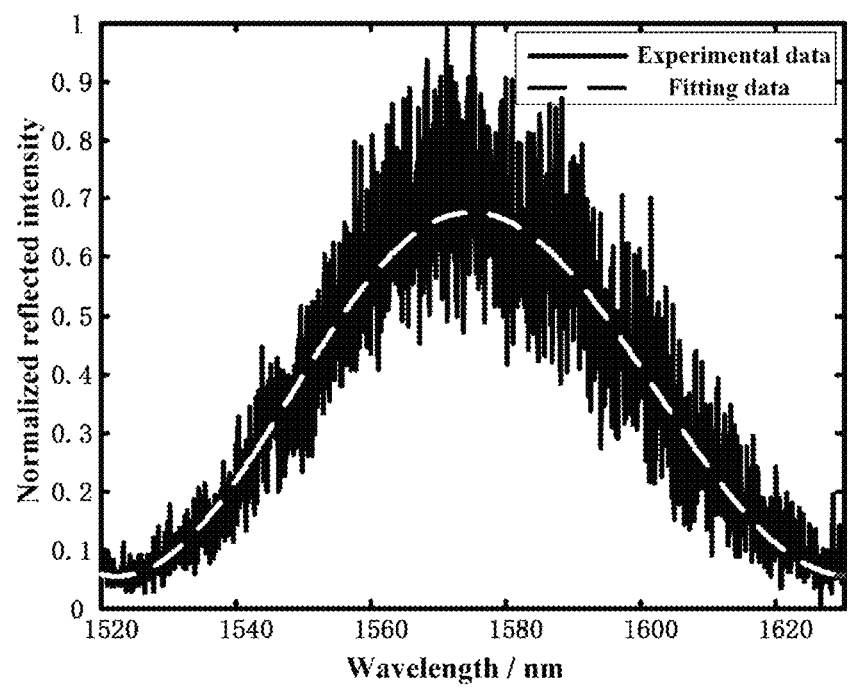
FIG. 4 shows a reflected spectrum of the FP cavity in the HC-PBF under test when the tunable laser source is tuned continuously from one wavelength to another within a range.

FIG. 4 shows a normalized reflected spectrum of the FP cavity induced by the Fabry-Perot cavity in the example. Fitting the curve of voltage intensity $V_{interference}$ versus wavelength $\lambda$ to equation (4) using a least-squares method will yield the value of the parameter d. The value of parameter d≈11.413 µm is the dimension of the FP cavity 25 corresponding to the distance between the two parallel air-$SiO_2$ interfaces ($A_+/A_-$) of the core 21, and is obtained when the fitting result is optimal. Meanwhile, this distance was measured five times at the same position, and the measurement standard deviation is 0.004 µm, so the distance between the two parallel air-$SiO_2$ interfaces ($A_+/A_-$) can be expressed as d=11.413±0.004 µm.

Step 7: identify six positions where the reflected voltage intensity is a local maximum in the course of rotating the FUT 20 from 0° to approximately 180°, and resolve the six distances at the six respective positions. Thereafter, the core size of the FUT 20 may be calculated from the six distances.

The output collimated light 11 from the SM collimator 3 is adjusted to ensure that its angle of incidence is 0° at two parallel air-$SiO_2$ interfaces of the core 21 of the fiber FUT 20 through by adjusting the six-axis translation stage 5 and rotation of the fiber FUT 20 from 0° to approximately 180°, so that an FP cavity 25 is formed. Six positions where the reflected voltage intensity is a local maximum are found. The TLS 1 is tuned continuously from one wavelength to another within a preset range, and reflected spectrums are obtained at the six different positions, the interference intensity of the six reflected spectrums are converted into voltage signals by the optical detector 6, then the voltage signals are passed to the oscilloscope 8. Fitting the six reflected spectrums (based on the voltage signals) to equation (4) using a least-squares method yields six distances of the FP cavity at six positions. From the six distances, the core size of the FUT 20 may be obtained.

In the illustrative example shown in FIG. 4, the distances of the six different Fabry-Perot cavities so obtained are, respectively, $|A_+A_-|$=11.413±0.004 µm, $|B_+B_-|$=11.7±0.002 µm, $|C_+C_-|$=11.362±0.003 µm, $|D_+D_-|$=11.605±0.003 µm, $|E_+E_-|$=11.317±0.003 µm, $|F_+F_-|$=11.627±0.002 µm. The core size of the FUT 20 may be calculated using the six distances.

Step 8: equidistantly move the SM collimator 3 along the axis of the FUT 20 with the six-axis translation stage 5, repeat step 1-7, and resolve core size at different axial positions, then the uniformity of the core size may be evaluated.

Note that the core 21 of the HC-PBF in the example has a dodecagonal cross section, therefore six distances are obtained at six respective positions. However, the application of the method and the apparatus of the present invention is not limited to this particular type of HC-PBF and a different number of d values may be required to determine the core size of the fiber.

The invention provides a nondestructive and simple method to measure the macroscopic size and its uniformity of the fiber core with high sensitivity and resolution, which can be used to assess performance of the HC-PBF.

What is claimed is:

1. An apparatus for nondestructive determination of core size of a hollow-core photonic bandgap fiber (HC-PBF) using Fabry-Perot (FP) interference, comprising:
    a tunable laser source (TLS), a 1×2 single-mode (SM) coupler, an SM collimator, a six-axis translation stage, an optical detector, an oscilloscope, and a container holding an index-matching oil;
    wherein the TLS and the input end of the optical detector are connected to the 1×2 SM coupler, the output end of the optical detector is connected to the oscillator, the SM collimator is connected to the 1×2 SM coupler, the SM collimator is fixed by a support fixture connected to the six-axis translation stage for adjusting the position of the SM collimator, wherein when the SM collimator and an HC-PBF under test (FUT) are immersed in the index-matching oil in the container, an FP cavity is generated in the FUT by adjusting the position of the SM collimator with the six-axis translation stage and by rotating the FUT;
    wherein when the TLS is continuously tuned from one wavelength to another within a preset wavelength range, a light emitted from the TLS passes through the 1×2 SM coupler and the SM collimator in sequence and turns into a spatially collimated light, which enters the FUT and is reflected by the FP cavity in the FUT, and the reflected light passes through the SM collimator and the 1×2 SM coupler in sequence to reach the optical detector, so that the size of the core of the FUT may be calculated from the reflected light's spectrum.

2. The apparatus of claim 1, wherein the index-matching oil has a refractive index within 1% of the refractive index of $SiO_2$.

3. A method of nondestructive determination of core size of a hollow-core photonic bandgap fiber (HC-PBF) using Fabry-Perot (FP) interference, comprising the steps of:

(a) providing an apparatus of claim 1;
(b) removing a coating of an HC-PBF under test (FUT), filling all air holes within the FUT, except a core thereof, with the index-matching oil, and immersing the FUT into the index-matching oil in the container;
(c) immersing the SM collimator into the index-matching oil by adjusting the six-axis translation stage;
(d) tuning on the TLS so that a light emitted from the TLS passes through the 1×2 SM coupler and the SM collimator in sequence and turns into a spatially collimated light;
(e) adjusting the position and angle of the SM collimator with the six-axis translation stage and rotating the FUT to generate an FP cavity in the FUT by causing the collimated light from the SM collimator to enter the core of the FUT between two air-SiO$_2$ interfaces at an incidence angle of approximately 90°, wherein the two air-SiO$_2$ interfaces form the FP cavity;
(f) tuning the TLS continuously from one wavelength to another within a preset wavelength range, whereby the collimated light entering the core of the FUT is reflected by the FP cavity, and the reflected light passes through the SM collimator and the 1×2 SM coupler so that an interference intensity is received by the optical detector for each of the tuned wavelengths;
(g) the optical detector converting the interference intensity into a voltage signal for each of the tuned wavelengths;
(h) the oscilloscope receiving the voltage signal from the optical detector and displaying a voltage intensity for each of the tuned wavelengths, thus obtaining a spectrum (voltage intensity versus wavelength) of the reflected light; and
(i) determining the core size of the FUT in a direction by applying a least squares method to the spectrum of the reflected light.

4. The method of claim 3, wherein the index-matching oil has a refractive index within 1% of the refractive index of SiO$_2$.

5. The method of claim 3, wherein in step (e) the collimated light from the SM collimator is caused to enter the core of the FUT between two air-SiO$_2$ interfaces at an incidence angle of approximately 90° by adjusting the position and angle of the FUT and rotating the FUT such that a local maximum voltage signal is observed at the oscilloscope for a tuned wavelength.

6. The method of claim 3, wherein step (i) comprises:
applying a least-squares method to fit the spectrum of the reflected light (voltage intensity $V_{interference}$ versus wavelength $\lambda$), to the following equation, to yield a value d of the distance between the two air-SiO$_2$ interfaces, $$V_{interference} = V_1 + V_2 + 2\sqrt{V_1 V_2} \cos\left(\frac{4\pi n d}{\lambda} + \pi\right)$$

where $V_1$, $V_2$ and $I_{interference}$ are voltage intensity corresponding to $I_1$, $I_2$ and $I_{interference}$ respectively; $I_1$ is the light intensity of $W_1$, $I_2$ is the light intensity of $W_2$, $W_1$ and $W_2$ are two parallel reflected lights from the two air-SiO$_2$ interfaces; n is the refractive index of air in the core of the FUT, and is approximately equal to 1.

7. The method of claim 3, further comprising:
(j) while rotating the FUT, repeating steps (e) to (i) to find a PF cavity formed by another set of two air-SiO$_2$ interfaces and determining the core size of the FUT in another direction.

8. The method of claim 6, further comprising:
(j) while rotating the FUT, repeating steps (e) to (i) to find a PF cavity formed by another set of two air-SiO$_2$ interfaces and determining the core size of the FUT in another direction.

9. The method of claim 7, wherein step (j) is performed 5 times so that the core size of the FUT is determined in six different directions in total.

10. The method of claim 8, wherein step (j) is performed 5 times so that the core size of the FUT is determined in six different directions in total.

11. The method of claim 9, further comprises
equidistantly moving the SM collimator along an axis of the FUT with the six-axis translation stage and, for each different axial position, repeating steps (a) to (i) to determine the core size in six different directions.

12. The method of claim 10, further comprises
equidistantly moving the SM collimator along an axis of the FUT with the six-axis translation stage and, for each different axial position, repeating steps (a) to (i) to determine the core size in six different directions.

* * * * *